US012774627B2

(12) United States Patent
Macernis

(10) Patent No.: US 12,774,627 B2
(45) Date of Patent: Oct. 27, 2026

(54) HINGE ASSEMBLY FOR SOFT-CLOSING GATES

(71) Applicant: Safetech Global Limited, Sheung Wan (HK)

(72) Inventor: Audrius Macernis, Victoria (AU)

(73) Assignee: Safetech global Limited, Sheung Wan (HK)

( * ) Notice: Subject to any disclaimer, the term of this patent is extended or adjusted under 35 U.S.C. 154(b) by 17 days.

(21) Appl. No.: 18/921,033

(22) Filed: Oct. 21, 2024

(65) Prior Publication Data

US 2026/0110206 A1 Apr. 23, 2026

(51) Int. Cl.
*E05F 1/08* (2006.01)
*E05F 1/12* (2006.01)

(52) U.S. Cl.
CPC ....... *E05F 1/1207* (2013.01); *E05Y 2201/499* (2024.05); *E05Y 2900/40* (2013.01)

(58) Field of Classification Search
CPC .. A47F 3/043; A47F 3/0434; A47F 2003/008; E05F 1/1215; E05F 1/12; E05F 1/1016; E05F 3/20; E05F 1/1223; E05F 1/1008; E05F 1/1025; E05F 1/1207; E05F 1/14; E05D 7/081; E05D 7/0009; E05Y 2201/21; E05Y 2201/25; E05Y 2201/484; E05Y 2201/492; E05Y 2201/496; E05Y 2201/499; E05Y 2201/702; E05Y 2201/704; E05Y 2201/71; E05Y 2900/20; E05Y 2900/202; E05Y 2900/30; E05Y 2900/40
See application file for complete search history.

(56) References Cited

U.S. PATENT DOCUMENTS

| | | | | |
|---|---|---|---|---|
| 1,810,534 A * | 6/1931 | Rubin | E05F 1/1215 16/301 |
| 4,073,037 A * | 2/1978 | Curry | E05D 7/1016 16/50 |
| 4,073,038 A * | 2/1978 | Curry | E05F 1/1215 16/50 |
| 4,583,262 A * | 4/1986 | Werner | E05F 1/1215 16/300 |

(Continued)

FOREIGN PATENT DOCUMENTS

| | | |
|---|---|---|
| AU | 2011200576 B2 | 9/2011 |
| CN | 211008102 U * | 7/2020 |

(Continued)

*Primary Examiner* — Chuck Y Mah
(74) *Attorney, Agent, or Firm* — S.J. INTELLECTUAL PROPERTY LTD.

(57) ABSTRACT

Disclosed herein is an improved hinge assembly for providing soft-closing functionality in a PVC (Polyvinyl Chloride) ate. The hinge assembly comprises a metal hinge body having a first frame and a second frame. A mounting element is adapted with respect to the first frame to slidably receive a spring-loaded actuator for providing self-closing functionality of the gate. A tension adjustment configuration is adapted with respect to the spring-loaded actuator to allow tension adjustment of a spring therein by using an Allen key. The spring-loaded actuator absorbs an impact of altering spring tension to thereby facilitate the soft-closing functionality while closing the gate.

6 Claims, 9 Drawing Sheets

(56) References Cited

U.S. PATENT DOCUMENTS

| | | | | | |
|---|---|---|---|---|---|
| 5,383,253 | A * | 1/1995 | Lin | E05F 3/20 | 16/300 |
| 7,895,713 | B2 * | 3/2011 | Williams, Jr. | E05D 5/06 | 16/389 |
| 8,966,713 | B1 * | 3/2015 | Russo | E05D 7/00 | 16/285 |
| D727,133 | S * | 4/2015 | Knudson | D8/323 | |
| 9,790,722 | B2 * | 10/2017 | Sun | F25D 23/028 | |
| 12,180,774 | B1 * | 12/2024 | Fisher | E05D 3/02 | |
| 2003/0051313 | A1 * | 3/2003 | Wu | E05F 1/1215 | 16/298 |
| 2005/0183238 | A1 * | 8/2005 | McCue | E05D 7/0423 | 16/236 |
| 2013/0205543 | A1 * | 8/2013 | Chen | E05F 1/1215 | 16/301 |
| 2018/0238092 | A1 * | 8/2018 | Feng | E05F 3/14 | |
| 2018/0363347 | A1 * | 12/2018 | Chang | E05F 1/1215 | |
| 2019/0106921 | A1 * | 4/2019 | Grewe | E05F 1/1016 | |
| 2020/0370348 | A1 * | 11/2020 | Naganuma | E05F 1/1008 | |
| 2021/0207417 | A1 * | 7/2021 | Koo | E05F 1/1215 | |

FOREIGN PATENT DOCUMENTS

| | | | | |
|---|---|---|---|---|
| CN | 213477960 | U * | 6/2021 | |
| CN | 214145119 | U * | 9/2021 | |
| FR | 3042213 | A1 * | 4/2017 | E05F 1/1215 |

* cited by examiner

HINGE ASSEMBLY FOR SOFT-CLOSING GATES

FIELD OF THE DISCLOSURE

The present invention relates to improvements in hinges, and is particularly, though not exclusively, applicable to hinges for self-closing gates and doors.

BACKGROUND OF THE DISCLOSURE

Gate hinges used for PVC (Polyvinyl Chloride) and Vinyl gates have been widely available in the market for many years. These hinges are typically made of metal, providing durability and strength. However, the tension adjustment mechanisms in conventional designs are often basic and lack flexibility, limiting precise control over the gate's self-closing function. These existing designs do not provide users with an efficient method to fine-tune the closing speed and force of the gate.

The present invention seeks to address this by offering a more advanced and adjustable hinge assembly that integrates a novel tension adjustment mechanism.

It is also desirable to provide a hinge which is easier to install and adjust than the prior hinges of the type described above.

It is further desirable to provide a hinge assembly that can be installed on the gates to provide soft closing functionality.

SUMMARY

The present invention seeks to address this by offering a more advanced and adjustable hinge assembly that integrates a novel tension adjustment mechanism. Accordingly, the present invention provides an improved hinge assembly for providing soft-closing functionality in a gate. The new hinge as described herein, comprises metal body essential to meet market expectations for strength and reliability. In addition to this, the hinge incorporates an innovative non-metal tension adjustment system, preferably of plastic, integrated into the metal structure. This new hinge allows for more precise and user-friendly control over the self-closing feature.

According to an embodiment of the present subject matter, an improved hinge assembly for providing soft-closing functionality in a gate such as PVC (Polyvinyl Chloride) and vinyl gates, is disclosed. The improved hinge assembly comprises: a metal hinge body having a first hinge frame and a second hinge frame rotatably coupled about a hinge axis; a mounting element fixed relative to the metal hinge body and is non-rotatable during operation of the hinge; a self-contained tension adjustment module formed as a discrete sub-assembly separate from the first and second hinge frames, the tension adjustment module comprising: a non-metallic hollow cylinder housing; a spring disposed within the housing and configured to generate a closing bias, and an adjustment member operable by a tool to vary tension of the spring; wherein the tension adjustment module is installed within the metal hinge body such that the housing is fixed relative to the mounting element while the adjustment member is rotatable relative to the housing; and wherein the first and second hinge frames rotate relative to one another independently of the tension adjustment module; and wherein adjustment of the spring tension occurs without rotation of the mounting element or the metal hinge body.

According to an embodiment of the present subject matter, the spring-loaded actuator comprises a hollow cylinder having its outer curved surface perpendicularly connected to an elongated arm in a 'T'shaped structure.

According to an embodiment of the present subject matter, the hollow cylinder accommodates the spring to provide adjustable spring tension to thereby control closing speed and force of the gate.

According to an embodiment of the present subject matter, each of the first frame and the second frame is casted to have a pair of clamps that protrude from respective surfaces to respectively engage the hollow cylinder and the elongated arm of the spring-loaded actuator. The two clamps are parallel to each other in each pair.

According to an embodiment of the present subject matter, the spring-loaded actuator is secured with the respective frames using various fasteners or fastening means.

According to an embodiment of the present subject matter, the mounting element is made up of a non-metallic material whereas the first frame and the second frame are metallic frames.

According to an embodiment of the present subject matter, the tension adjustment module is removable from the metal hinge body as a unit without disassembly of the hinge frames.

According to an embodiment of the present subject matter, the improved hinge assembly is compatible with existing gate configurations for easy replacement of conventional hinges.

According to an embodiment of the present subject matter, the tension adjustment configuration comprises a top cap having an Allen key socket, and a bottom cap.

According to an embodiment of the present subject matter, the hollow cylinder accommodating the spring is installed on the mounting element by using the top cap adapted over the spring and the bottom cap adapted below another end of the spring.

According to an embodiment of the present subject matter, the top cap passes through a top sleeve and the bottom cap passes through a bottom sleeve to install the hollow cylinder with the mounting element.

According to an embodiment of the present subject matter, the top cap passes through the top sleeve and the bottom cap passes through the bottom sleeve to install the elongated hollow cylinder with the mounting element.

Other objects and advantages of the embodiments herein will become readily apparent from the following detailed description taken in conjunction with the accompanying drawings.

BRIEF DESCRIPTION OF THE DRAWING

Preferred embodiments of the invention will now be described by way of non-limiting examples only by reference to the accompanying drawings, in which.

Like reference numerals refer to like parts throughout the description of several views of the drawings.

FIGURES REFERENCE NUMERAL

Figure 1:
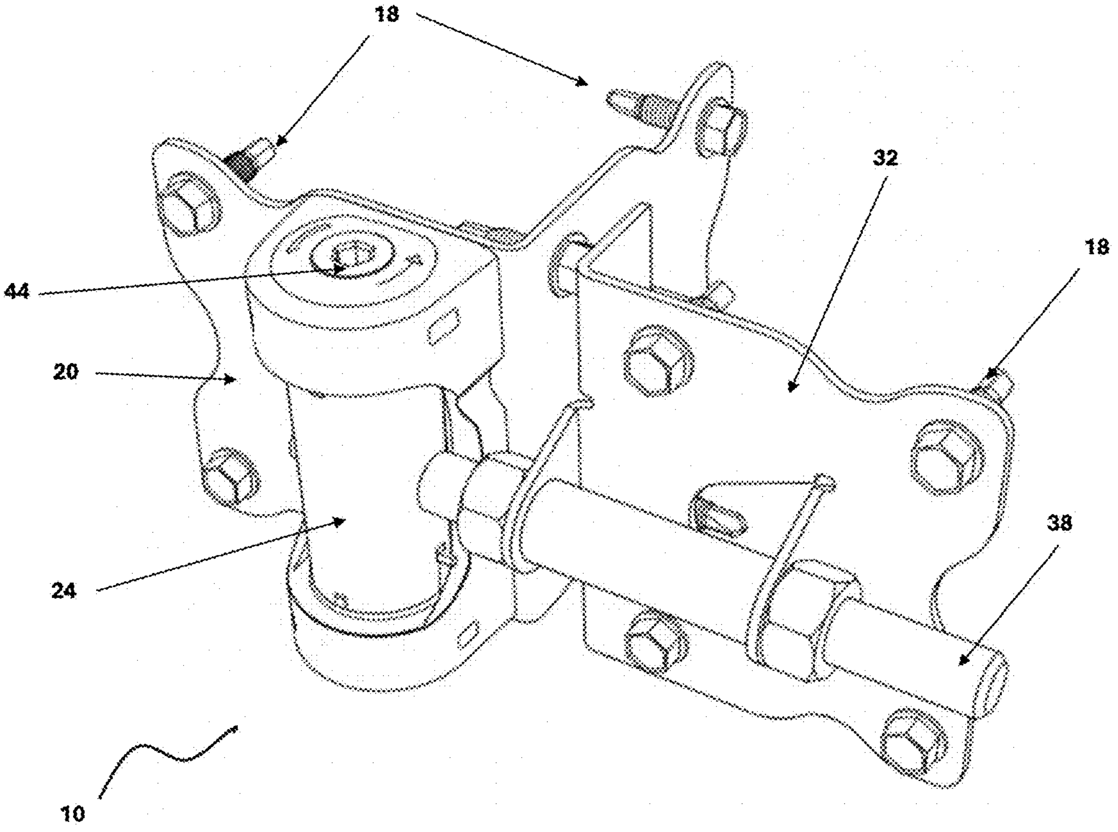
FIG. 1, according to an embodiment of the present invention, shows perspective view of the hinge assembly.

10 Hinge Assembly
12 Bottom Cap
14 Bottom Sleeve
16 Elongated Arm
18 Fasteners
20 First Frame
22 First Pair of Clamps
24 Hollow Cylinder
26 Metal Hinge Body
28 Mounting Element
30 Outer Curved Surface of Hollow Cylinder
32 Second Frame
34 Second Pair of Clamps
36 Spring
38 Spring-Loaded Actuator
40 Top Cap
42 Top Sleeve
44 Allen Keyhole

DESCRIPTION OF PREFERRED EMBODIMENT

This section is intended to provide an explanation and description of various possible embodiments of the present invention. The embodiments used herein, and various features and advantageous details thereof are explained more fully with reference to non-limiting embodiments illustrated in the accompanying drawings and detailed in the following description. The examples used herein are intended only to facilitate an understanding of ways in which the embodiments herein may be practised and to further enable the person skilled in the art to practice the embodiments used herein. Also, the examples/embodiments described herein should not be construed as limiting the scope of the embodiments herein. Corresponding reference numerals indicate corresponding parts throughout the drawings.

As used herein, "Self-contained tension adjustment module" refers to an assembly having a hollow cylinder that is a non-metallic housing installed to house a spring and an adjustment member and is installable as a unit within a hinge body.

As used herein, "Fixed" refers to a component that does not rotate during hinge operation.

As used herein, "Rotatable" refers to a component configured to rotate relative to a fixed component.

Figure 2:
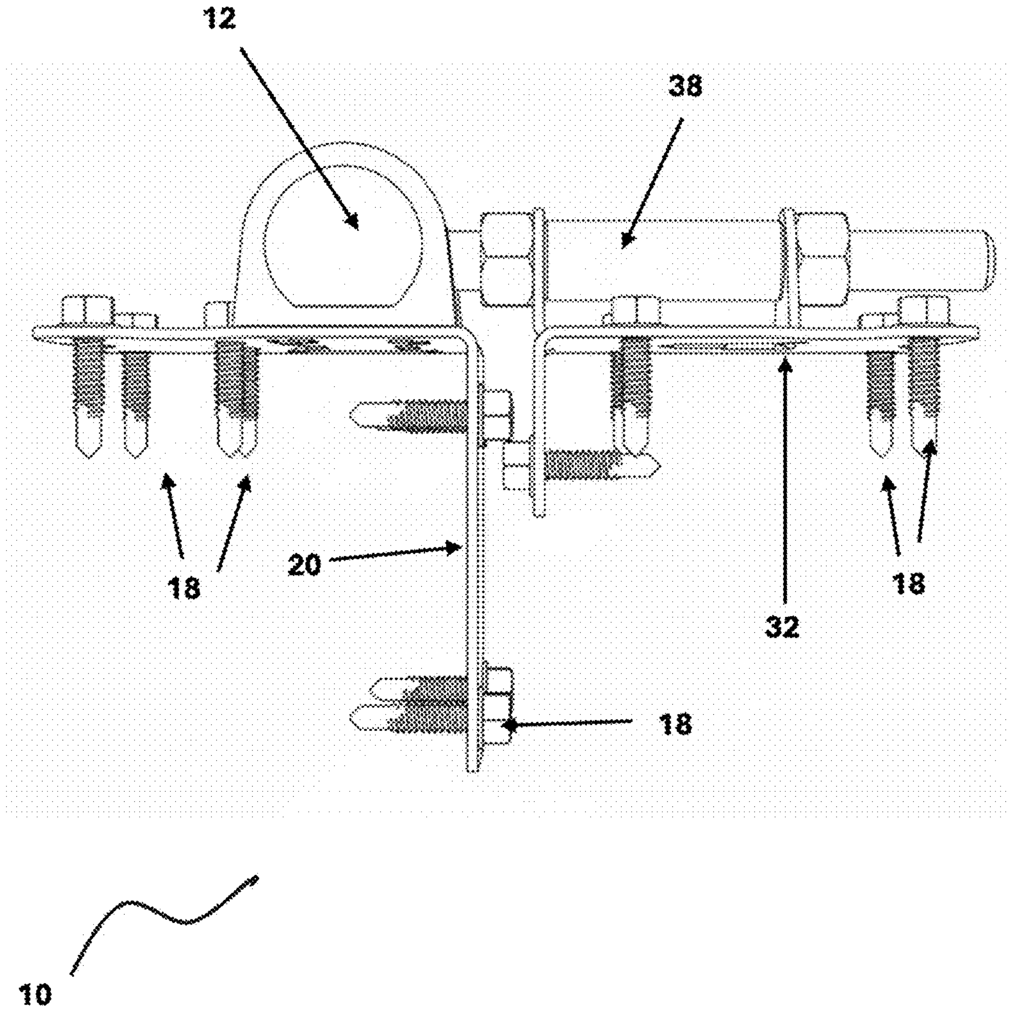
FIG. 2, according to an embodiment of the present invention, shows bottom view of the hinge assembly.
Figure 3:
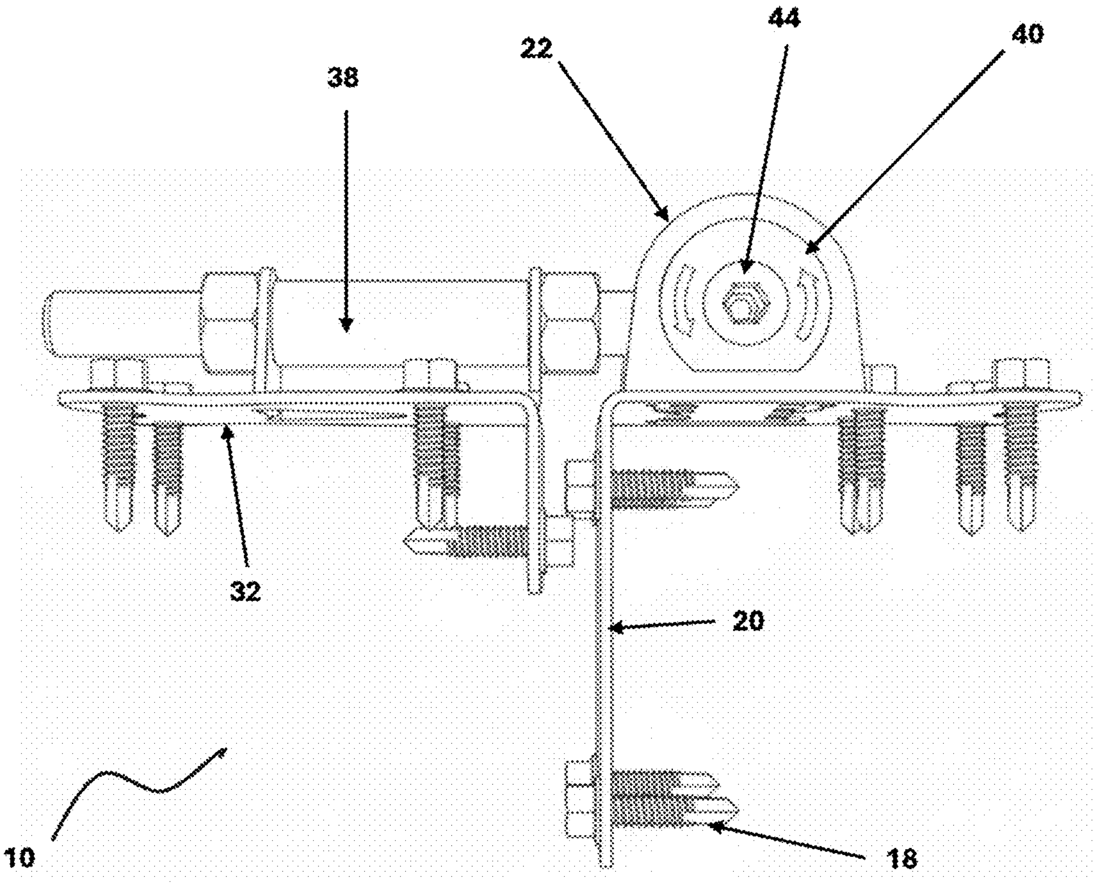
FIG. 3, according to an embodiment of the present invention, shows top view of the hinge assembly, also illustrating a pair of hinge leaves.
Figure 4:
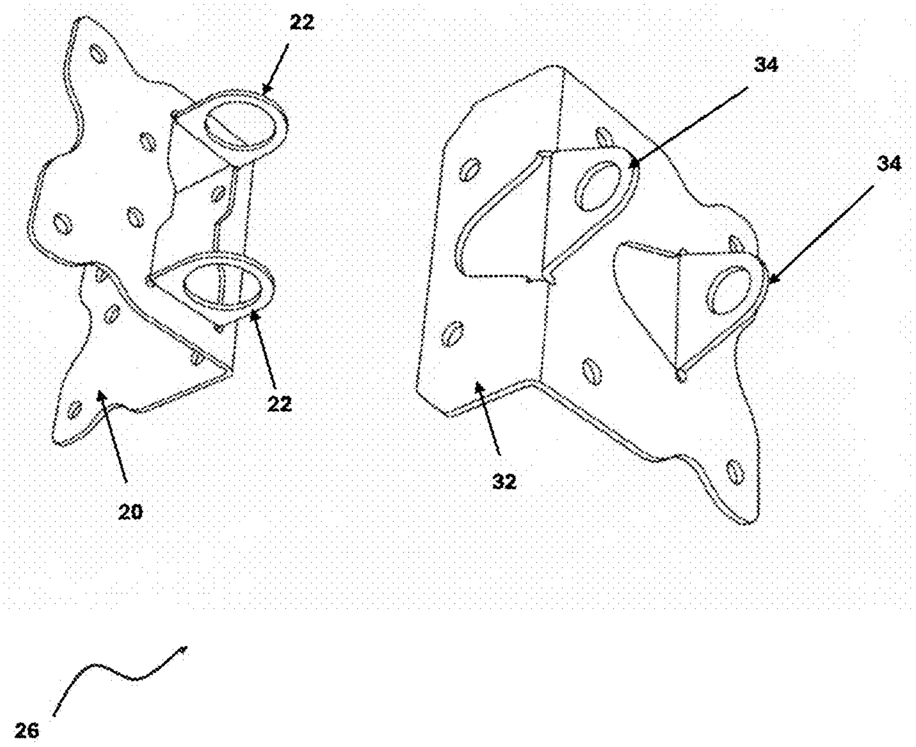
FIG. 4, according to an embodiment of the present invention, shows components of hinge body, a pair of hinge frames.
Figure 5:
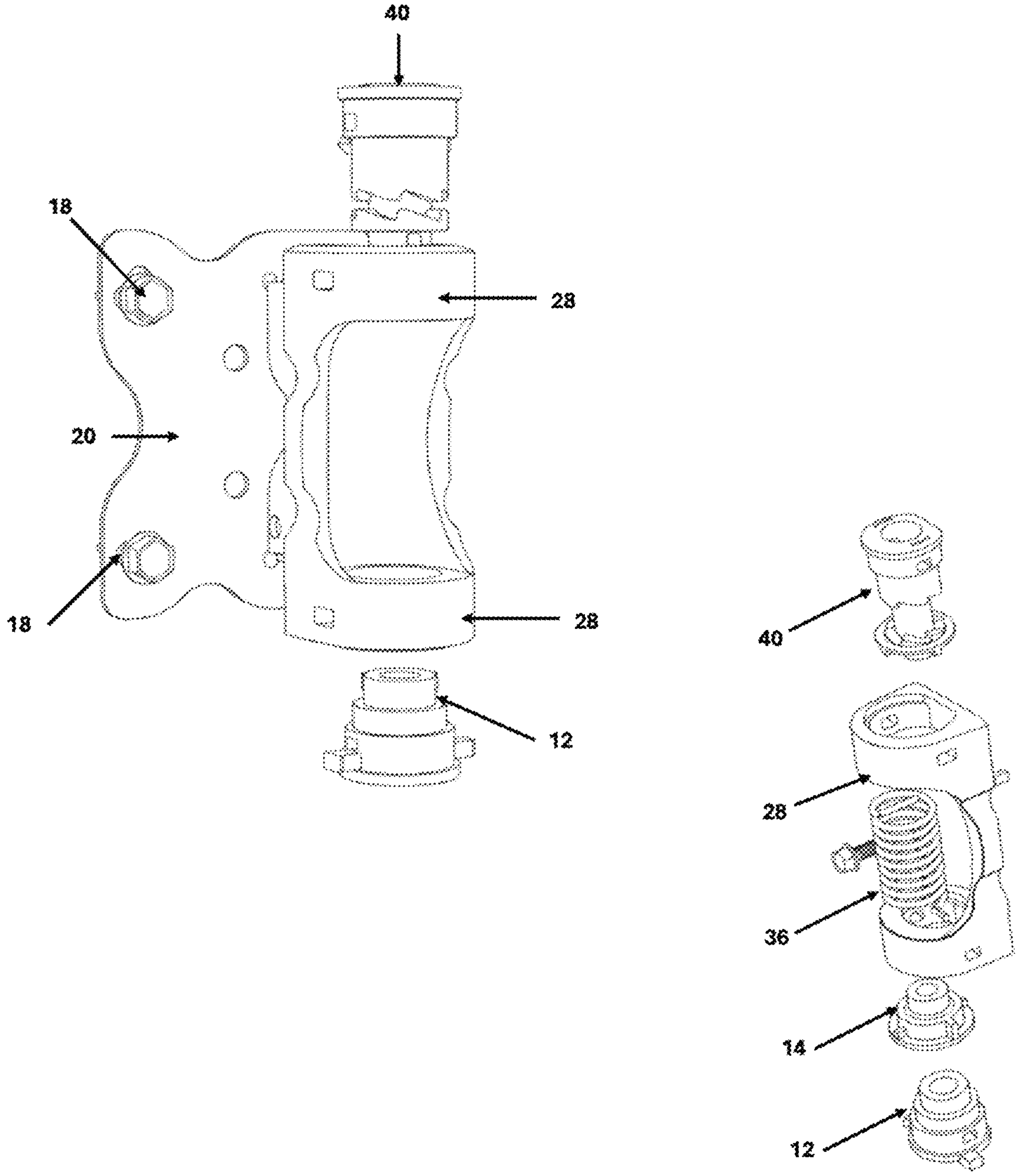
FIG. 5, according to an embodiment of the present invention, shows an exploded view of the mounting element and the spring.

FIG. 1, according to an embodiment of the present invention, shows perspective view of the hinge assembly. FIG. 2 and FIG. 3 show bottom view and top view of the hinge assembly respectively. FIG. 4, shows components of hinge body, a pair of hinge frames. FIG. 5, shows an exploded view of the mounting element and the spring.

Figure 6:
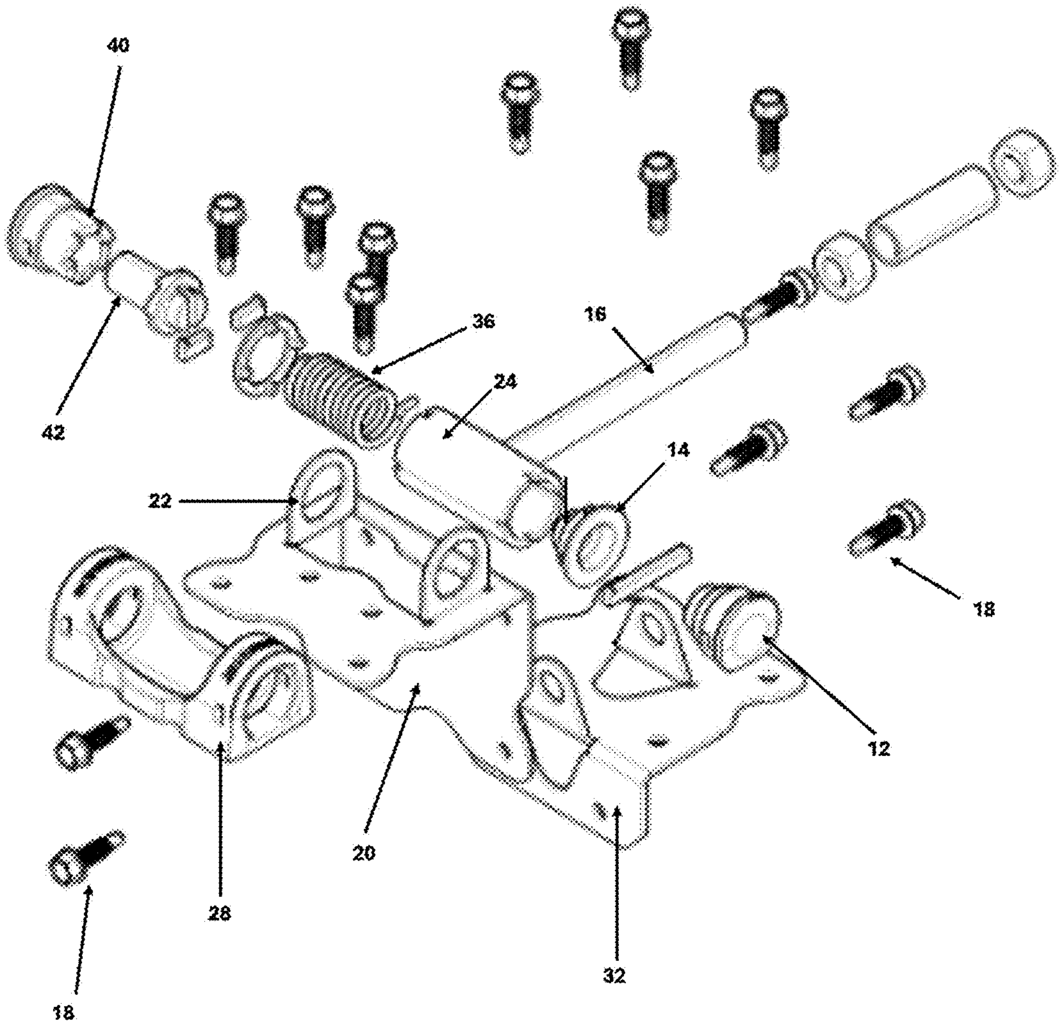
FIG. 6, according to an embodiment of the present invention, shows exploded view of the hinge assembly.
Figure 7:
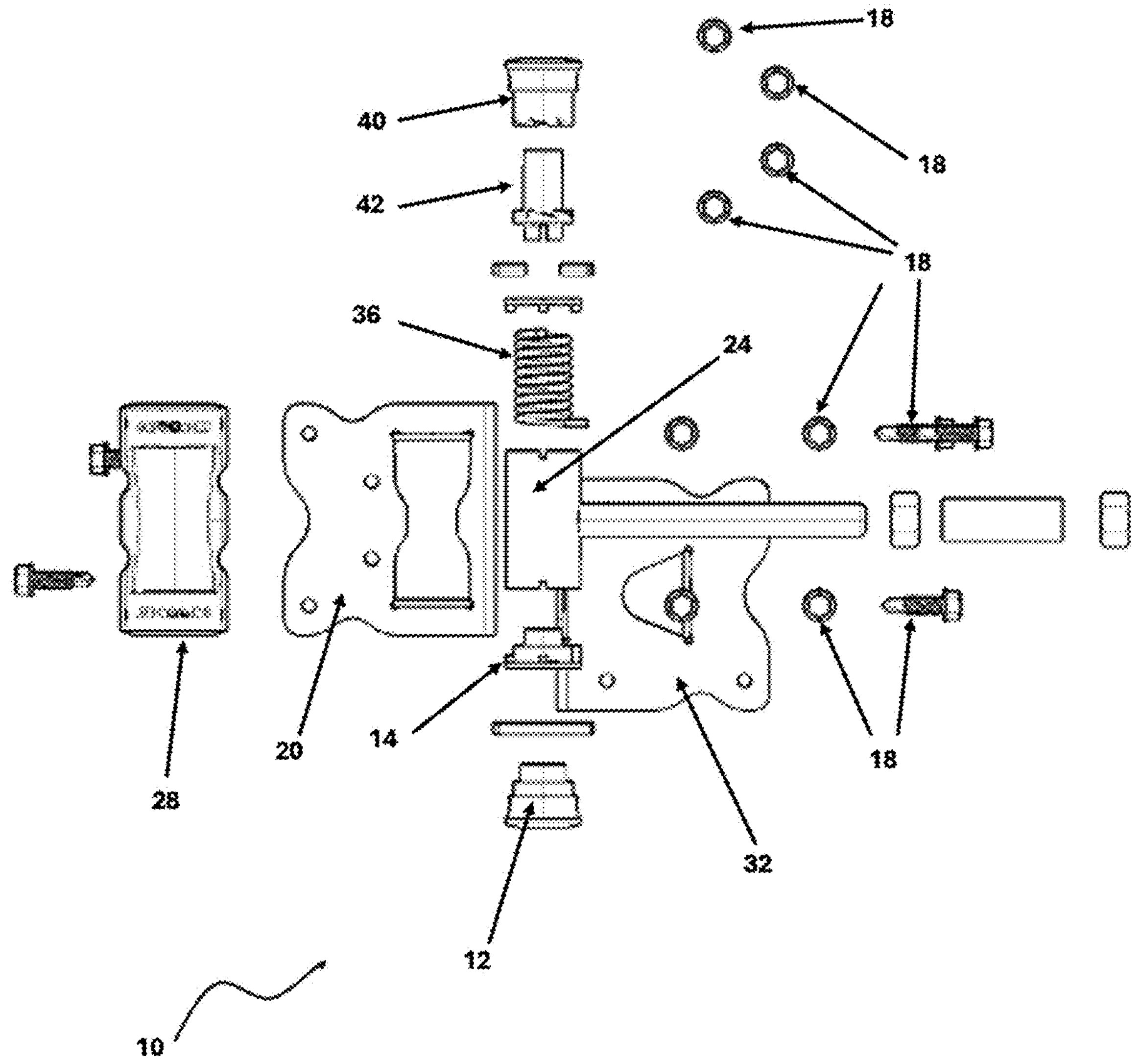
FIG. 7, according to an embodiment of the present invention, is another exploded view of the hinge assembly, illustrating the front part of the hinge assembly.
Figure 8:
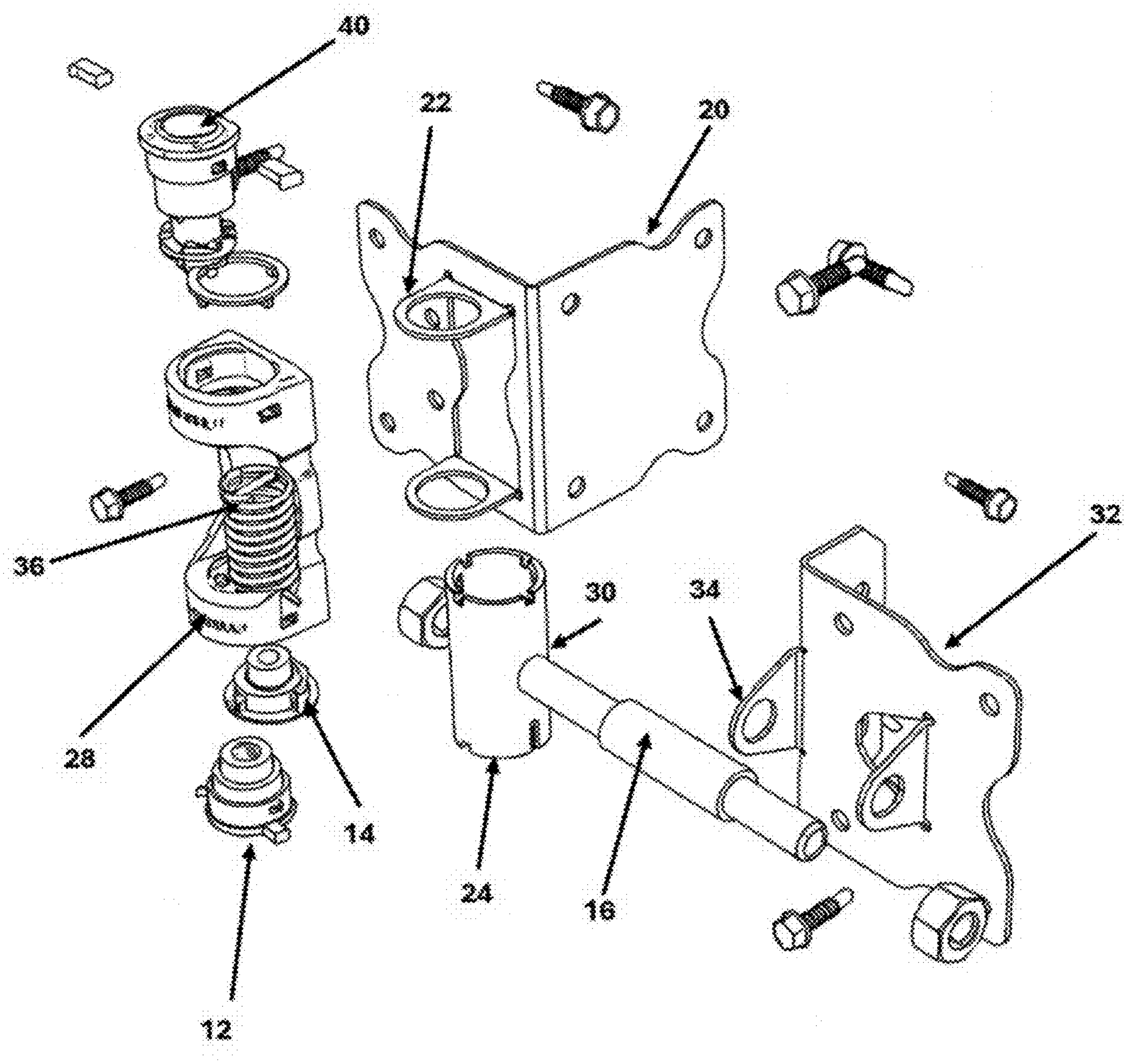
FIG. 8, according to an embodiment of the present invention, is another exploded view of the hinge assembly.
Figure 9A:
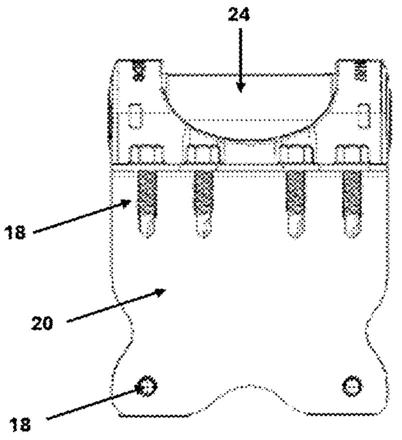
FIG. 9, according to an embodiment of the present invention, are schematic representations of right and left side views (FIGS. 9A, 9B), and front view (FIG. 9C) and rear view (FIG. 9D) of the hinge assembly.
Figure 9B:
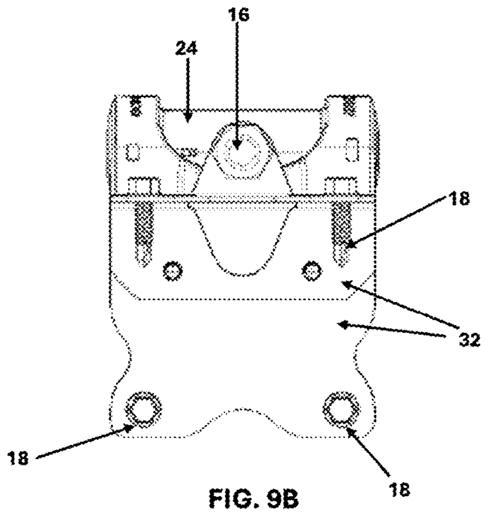
Figure 9C:
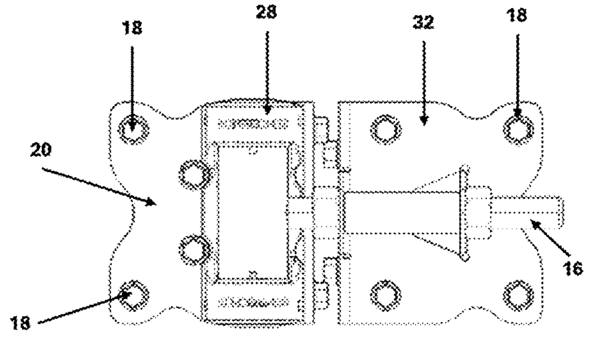
Figure 9D:
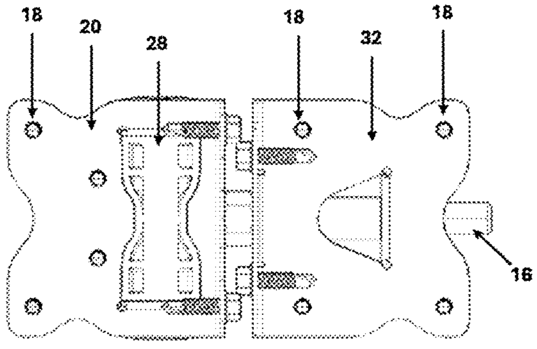

FIG. 6, FIG. 7, FIG. 8, according to an embodiment of the present invention, shows various exploded views of the hinge assembly. FIG. 9, according to an embodiment of the present invention, are four schematic representations of side views, and front and rear views of the hinge assembly.

Referring now to FIG. 1-FIG. 9, the hinge assembly 10 (or the hinge 10) is an improved hinge assembly 10 for providing soft-closing functionality in a gate, such as a PVC (Polyvinyl Chloride) gate, vinyl gate etc. The hinge assembly 10 consists of a metal body 26 (such as made up of steel) that serves as the primary structure to ensure stability and strength when installed on PVC or other heavy gates. The hinge features an internal tension spring 36 housed within a cylindrical chamber 24. Particularly, the hinge assembly 10 comprises a metal hinge body 26 having a first frame 20 and a second frame 32. A mounting element 28 is adapted with respect to the first frame 20 to slidably receive a spring-loaded actuator 38 for providing self-closing functionality of the gate. A tension adjustment device configuration is adapted with respect to the spring-loaded actuator 38 to allow tension adjustment of the spring 36 therein by using an Allen key that can be inserted in an Allen keyhole 44 provided therein. The spring-loaded actuator 38 absorbs an impact of altering spring 36 tension to thereby facilitate the soft-closing functionality while closing the gate. The design of the hinge assembly 10, enables the user to rotate the key to increase the spring tension, making the gate close faster, or to reduce the tension for slower movement. The adjustment mechanism or the spring loaded actuator 38 of the hinge assembly 10 is easy to access and operate, making the hinge suitable for various gate weights and usage requirements. The improved hinge assembly 10 is designed to be compatible with existing gate configurations for easy replacement of conventional hinges.

According to the embodiments of the present invention, the spring-loaded actuator 38 comprises the hollow cylinder 24 having its outer curved surface 30 perpendicularly connected to an elongated arm 16 in a 'T' shaped structure as shown in FIGS. 6-8. The hollow cylinder 24 accommodates the spring 36 to provide adjustable spring tension to thereby control closing speed and force of the PVC gate movement. Further, each of the first frame 20 and the second frame 32 is casted/moulded to have a pair of ring-shaped clamps 22, 34, protruding from respective surfaces as shown in FIG. 4 and other drawings. This makes the first pair of clamps 22 to engage the hollow cylinder 24, while the second pair of clamps 34 engage the elongated arm 16 of the spring-loaded actuator 38. The elongated arm 16 is assembled using an elongated rod and a hollow sleeve as shown in FIG. 6. The rod is inserted inside the hollow sleeve and one end of the rod is connected to the outer curved surface 30 of the actuator cylinder 24. Once the actuator 38 parts are assembled and engaged in respective clamps 22, 34, the spring-loaded actuator 38 may be secured with the respective frames (the first frame 20 and the second frame 32) using suitable fastening means or fasteners 18 such as nuts and bolts, screws, rivets etc. Various screws and bolts are included to securely attach the hinge assembly 10 to the required gate post and its gate.

In one embodiment herein, the mounting element 28 is made up of a non-metallic material, such as plastic, whereas the first frame 20 and the second frame 32 are metallic frames, such as steel frames, that together form the hinge body 26. The tension adjustment configuration comprises a top cap 40 having an Allen key socket 44 or Allen keyhole 44, and a bottom cap 12. The tension adjustment configuration is operated to increase tension by rotating the Allen key. The arrow mark is provided on the top cap 40, as shown in FIGS. 1 and 3. The hollow cylinder 24 accommodating the spring 36 is installed on the mounting element 28 by using the top cap 40 adapted over the spring 36 and the bottom cap 12 adapted below another end of the spring 36. The top cap 40 passes through a top sleeve and the bottom cap 12 passes through a bottom sleeve 14 to install the hollow cylinder 24 with the mounting element 28. The adjustment mechanism enhances ease of use while maintaining the essential functionality expected in gate hinges.

The mounting element 28 has a curved inner surface to slidably receive the spring-loaded cylinder as shown in various Figures. The pair of hinge frames, the first frame 20 and the second frame 32 together form a hinge body 26 that can be mounted on the gate and its corresponding gate post. The pair of hinge frames move rotatably between an open position and a closed position to thereby open and close the gate. Thus, as the two frames of the hinge open and close, the gate or a door on which the hinge assembly 10 is mounted can be opened and close. The closing of the gate or door (not shown) is done automatically in a soft closing manner even if the door is shut with force. This helps restrict the banging of the doors when the doors are being shut. The components of the hinge assembly 10 are assembled and secured using several fastening means 18 and fixing elements as mentioned earlier.

The spring 36 and tension components are adapted within the hollow cylinder 24. The spring 36 is adapted to be adjusted using the Allen key for altering spring tension. The actuator 38 absorbs the impact of the altering spring tension to thereby facilitate the soft-closing functionality while closing the gate. The actuator 38 comprises the elongated arm 16 in a 'T' shaped three-dimensional structure fixed on one side of the outside surface of the hollow cylinder 24 as described earlier. The actuator 38 rests on grooves provided on one side of the mounting element 28. The opposite or rear side of the mounting element 28 may be curved or flat in shape.

According to an embodiment of the present subject matter, the top cap 40 is adapted to engage a first end of the spring 36 to an engaging part of the spring 36, and a second end of the spring 36 is engaged with one end of the bottom cap 12. The top cap 40 is adapted to provide an easy grip and is rotated for adjusting the tension.

According to an embodiment of the present subject matter, the spring 36 is inserted inside the hollow cylinder 24. The hollow cylinder 24 is installed on the mounting element 28 by fixing the top cap 40 removably adapted over the spring 36. Further, the bottom cap 12 is adapted to engage another end of the spring 36. The top cap 40 passes through the top sleeve and the bottom cap 12 passes through the bottom sleeve 14 to install the hollow cylinder 24 with the mounting element 28.

Referring now to FIG. 4, the first frame 20 and the second frame 32 of the hinge body 26 have multiple holes for receiving fastening means/fasteners 18, for example bolts, to secure the first and second hinge frame to a post and gate (not shown), respectively. It will also be appreciated that the hinge assembly 10 can be used with a door, with the first hinge frame 20 being mountable to the gate post and the second frame 32 being mountable to the gate.

The mounting element 28 is designed to have a socket or suitable slot to easily receive the hollow cylinder 24. The second hinge frame 32 may rotate about the longitudinal axis of the mounting element 28 in order for the hinge 10 (or the hinge assembly 10) to move between the closed and open position.

The spring 36 of the embodiments shown in the figures is a helical spring 36. The opposite ends of the spring 36 are connected to respective top cap 40 and bottom cap 12. The hinge body 26 provides rotational movement of the hinge frames with respect to each other.

The hinge assembly 10 of the present invention consists of a metal hinge body 26, plastic components, and an integrated tension adjustment mechanism. The assembly 10 includes a spring-loaded mechanism that allows for providing controlled gate movement, reducing wear and tear on the gate and improving overall durability. The primary feature of this invention is the adjustable tension system that can be modified using an Allen key. The mechanism provides for a rotatable adjustment to increase the tension, offering better control over the gate's self-closing function.

Thus, the above-described hinge assembly 10 is an improved hinge assembly 10 that is designed to perform two kinds of functionalities. The first is to provide adjustments in the spring 36 to increase or decrease the tension of the spring 36. The second functionality is to absorbs an impact of the altering spring tension to thereby facilitate the soft-closing functionality while closing the gate.

The term exemplary is used herein to mean serving as an example. Any embodiment or implementation described as exemplary is not necessarily to be construed as preferred or advantageous over other embodiments or implementations. Further, the use of terms such as including, comprising, having, containing and variations thereof, is meant to encompass the items/components/process listed thereafter and equivalents thereof as well as additional items/components/process.

Although the subject matter is described in language specific to structural features and/or acts, it is to be understood that the subject matter defined in the claims is not necessarily limited to the specific features or process as described above. In fact, the specific features and acts described above are disclosed as mere examples of implementing the claims and other equivalent features and processes which are intended to be within the scope of the claims.

The invention claimed is:

1. An improved hinge assembly for providing soft-closing functionality in a gate, the hinge assembly comprising:

a hinge body having a first metallic hinge frame and a second metallic hinge frame rotatably coupled about a hinge axis;

a mounting element fixed on the first hinge frame;

the mounting element defining a housing that receives a tension adjustment configuration;

wherein the tension adjustment configuration comprises: a non-metallic hollow cylinder rotatably received within the mounting element; a spring disposed within the hollow cylinder, the spring having a first end retained by a top sleeve and a second end retained by a bottom sleeve fixed within the hollow cylinder; the top sleeve having an Allen-key-shaped profile at its top end, the top sleeve being rotatably adjustable received within a central aperture of a top cap; and said top cap fixed to the mounting element and having engagement features on its bottom face configured to engage the top sleeve and retain the top sleeve in an adjusted rotational position;

wherein the hollow cylinder includes an elongated arm, the elongated arm, and the second hinge frame rotate together as one unit about the hinge axis relative to the mounting element and the first hinge frame, such that rotational movement of the second hinge frame drives the hollow cylinder and winds the spring to bias the hinge assembly toward a closed position;

wherein tension of the spring is adjusted by inserting an Allen key through an aperture in the top cap to engage said Allen-key-shaped profile and rotate the top sleeve, thereby winding the spring, and wherein the engagement features of the top cap retain the top sleeve in the adjusted position without rotation of the top cap or the mounting element; and wherein spring tension is released by inserting a tool through the central aperture in the top cap to depress the top sleeve downwardly, thereby disengaging the top cap and the top sleeve and allowing the spring to return to its original position.

2. The improved hinge assembly of claim 1, wherein the hollow cylinder houses the spring to provide adjustable spring tension to thereby control closing speed and force of the gate.

3. The improved hinge assembly of claim 1, wherein the first hinge frame has a first pair of clamps protruding from its surface that engage the mounting element to retain the mounting element fixed relative to the first hinge frame, and wherein the second hinge frame has a second pair of clamps protruding from its surface that grip and secure the elongated arm thereto by fastening means, such that the second hinge frame and the elongated arm rotate together as one unit.

4. The improved hinge assembly of claim 1, wherein the mounting element is made up of a non-metallic material whereas the first binge frame and the second hinge frame are metallic frames that together form the hinge body.

5. The improved hinge assembly of claim 1, wherein spring tension is increased by rotating the top sleeve in an anticlockwise direction via an Allen key inserted through the central aperture in the top cap.

6. The improved hinge assembly of claim 1, wherein said hinge assembly is compatible with existing gate configurations for easy replacement of conventional hinges.

* * * * *